Patented June 29, 1954

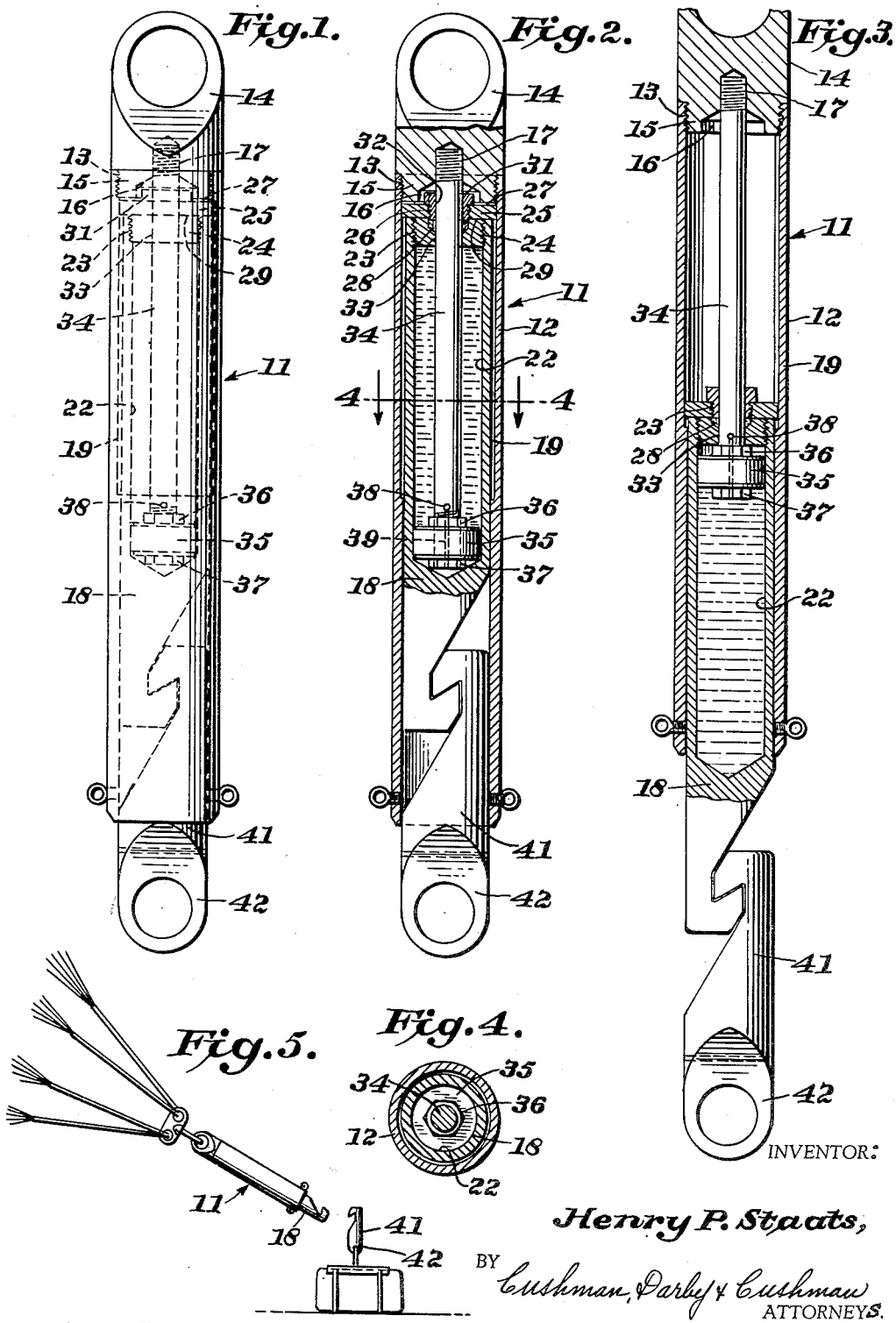

2,682,425

UNITED STATES PATENT OFFICE 2,682,425

BURDEN RELEASE FOR PARACHUTES

Henry P. Staats, Litchfield, Conn.

Application October 8, 1951, Serial No. 250,219

1 Claim. (Cl. 294—83)

The present invention relates to apparatus for supporting a load from a carrier device disposed thereabove and having means associated therewith for releasing the load from the device in response to an impact received by the load after a predetermined interval has elapsed. More particularly, my invention relates to apparatus for supporting a load from a parachute in such a manner that the load will be automatically released when the load strikes the surface of the earth and is an improvement of the device disclosed in my United States Patent No. 2,517,361, granted on August 1, 1950.

An object of the invention is to provide such an apparatus which is capable of positive and instantaneous release of the load from the parachute when the load strikes the surface of the earth and having structure associated therewith for preventing a premature release of the load as, for example, at the time when the parachute and its load are discharged from the aircraft.

Another object of the present invention is the provision of a load releasing apparatus for parachutes which includes a hydraulic expandable joint having a damping device associated therewith for preventing the release of the load from the parachute prior to the elapse of a predetermined interval of time.

An additional object of the invention is to provide such an apparatus characterized by the simplicity of its operation, its ruggedness under all conditions of service, and its inherent design characteristics which render it capable of being manufactured by mass production methods.

Other objects and many of the attendant advantages of this invention will be readily appreciated as the same becomes better understood by reference to the following detailed description when considered in regard with the accompanying drawing wherein:

Fig. 1 is a side elevational view of the apparatus in its unloaded condition, or in the condition the apparatus assumes shortly after the parachute is discharged from the aircraft and before the hydraulic joint and damping means have been set in operation.

Fig. 2 is a side elevational view with portions thereof broken away and other portions thereof being illustrated in section to better disclose the internal structure of my invention, the various parts being illustrated in their relative positions prior to the actuation of the hydraulic joint and damping means.

Fig. 3 is a side elevational view with parts thereof broken away and partly in section similar to Fig. 2 except that the various parts are shown in their respective positions after the hydraulic joint and clamping means have fully operated for the predetermined interval of time.

Fig. 4 is a horizontal section of the device as viewed from section line 4—4 in Fig. 2, and Fig. 5 is a diagrammatic view generally illustrating the manner in which the mechanism operates to release the load when the latter reaches the surface of the earth.

Referring now to the accompanying drawings in which like reference numerals are employed to designate like parts, and more particularly to Figs. 1 and 2 thereof in which reference numeral 11 generally designates the load supporting apparatus of my invention, it will be noted that a control yoke or sleeve 12 is provided with internal threads 13 at one end thereof. A ring fitting 14 forms the cap piece of the sleeve 12 and is provided with a depending externally threaded pin 15 which is designed to threadably engage the internal threads 12 at the upper end of sleeve 12.

The lower face of the depending pin 15 is counter-bored as indicated at 16. A hole 17 is provided in the ring fitting 14 and is coaxially arranged with respect to the longitudinal axis of the ring fitting 14 and the counter-bore 16 of the depending pin 15. This hole 17 is internally threaded for the purpose of threadably receiving the piston rod of the hydraulic joint, more fully described hereinafter.

The sleeve 12 is provided with an enlarged internal bore 19 constructed to slidably receive a stop plug employed for a purpose to be later explained.

The upper clasp member 18 is also provided with a counter-bore 22 which longitudinally extends an appreciable distance through the length of member 18 and is provided at its upper end with internal threads 23 for threadably receiving externally threaded pin 24 of the stop plug 25. The counter-bore 22 serves as a cylinder for enclosing a hydraulic fluid which cooperates with the hydraulic joint and damping means in a manner which will become more readily apparent as the description proceeds. A counter-bore 26 is provided within the cap portion 27 and the depending pin 24 of the stop plug 25 for receiving a packing material 28, such for example, as an O-ring of a rubber-like material. The wall portion of the counter-bore 26 is provided with threads for receiving the externally threaded pin 29 of a packing nut 31.

The packing nut 31 and the stop plug 25 are provided with registering bores 32 and 33, respectively, which are in longitudinal alignment with the internally threaded hole 17 in the ring fitting 14. A piston rod 34 is threaded at one end thereof into the hole 17 and extends through the bores 32 and 33 into the cylinder 22. The other end of the piston rod carries a piston 35 which is secured to the piston rod by the jam nuts 36 and 37, respectively, disposed upon the upper and lower surfaces of the piston 35.

The piston rod 34 is provided with a hydraulic damping means which includes the transverse port 38 which is in fluid communication with a longitudinal passage 39 extending through the central portion of the piston rod and terminating at the lower surface of jam nut 37 whereby a fluid path is effected to accommodate the flow of a hydraulic fluid from one side of the piston to the other in response to actuations of the piston.

The lower end of the upper clasp member 18 is provided with a hook of the type disclosed in my aforementioned patent and will not be further described here. The lower clasp fitting 41 includes a hook member at the upper end thereof which is complementary to the configuration of the hook member at the lower end of the upper clasp member and, since this hook portion is fully described in my aforementioned patent, further description here is regarded as unnecessary. The lower end of the lower clasp member 41 is provided with a ring fitting 42 for facilitating the attachment of the load to the automatic release device.

To assemble the automatic burden release device of the present invention, the piston rod 34 and its piston 35 are first inserted into cylinder 22 of the upper clasp member 18. The hook of the lower clasp member 41 is then connected to the hook of the upper clasp member 18 and sleeve 12 is slid over upper clasp member and downwardly to its initial position shown in Figure 2, whereby the hook portions of the upper and lower clasp members are maintained in their connected positions. The cylinder 22 is then filled with a hydraulic fluid and the stop plug 25 is slid over the upper end portion of piston rod 34 and threaded into the upper end of the cylinder. Next, the packing material 28 is placed within the counter-bore 26 around the piston rod 34 and the packing nut 31 is threaded into the counter-bore 26 to force the packing material into fluid tight engagement with the piston rod and the wall portions of the counter-bore 26. Finally, the ring fitting 14 is threaded onto the upper end of piston rod 34 and into the upper end of the sleeve 12. The device is now ready to be connected between a parachute and its load and placed in operation.

In operation, the release device of my invention, when attached between a parachute and its load by the upper ring fitting 14 and lower fitting 41, respectively, and when discharged from an aircraft, the shroud lines of the parachute tend to pull in a direction opposite to the direction of pull exerted by the load which forces the sleeve 12, piston rod 34 and its piston 35 upwardly relative to the remainder of the device. The piston 35 is moved upwardly at a predetermined rate of speed by reason of the provision of a hydraulic damping means comprising port 38 and passage 39 which are designed to permit hydraulic fluid to bleed therethrough at a predetermined fixed rate of flow. It will be observed, therefore, that the piston 35 with its associated hydraulic damping means functions to damp the movement of sleeve 12 during a predetermined interval of time, dependent upon the weight of the load. After the predetermined time interval has elapsed the piston 35 will rest at the upper end of the cylinder 22, and the upper and lower clasp members 18 and 41, respectively, will have moved relative to the sleeve 12 to such a position that the hook portions thereof will be fully exposed to thereby permit the disconnection of the parachute from its load in response to a slightest impact received by the load.

Briefly stated in summary, the present invention contemplates provision of a new and improved mechanism for disconnecting a parachute from its load in response to an impact received by the load subsequent to the elapse of a predetermined interval of time.

To accomplish the desired functions of such an apparatus, a cylinder filled with a hydraulic fluid is provided within an upper clasp member which is telescopically received within a sleeve carried by the parachute. This sleeve also encloses the hooked portions of the upper clasp member and a lower clasp member connected thereto. In response to the upward and downward pull of the parachute and load, respectively, against the mechanism, the cylinder moves downwardly through the sleeve at a predetermined rate of speed in accordance with the size of a bleeder hole provided from one side to the other of a piston disposed within the cylinder, this piston being rigidly connected to the sleeve. Upon the elapse of the predetermined interval of time the cylinder within the upper clasp member will have moved downwardly relative to the sleeve to such a position that the hooked portions of the upper and lower clasp members, respectively, will have moved downwardly to a position entirely outside the lower end of the sleeve. Thereafter, should the load receive the slightest impact, the hooked portions of the upper and lower clasp members will be disconnected and, therefore, the parachute will be disconnected from its load.

While the invention has been described with reference to a preferred example thereof which gives satisfactory results, it will be understood by those skilled in the art to which the invention pertains that various changes and modifications may be made without departing from the spirit and scope of the invention, and it is my intention to cover in the appended claim all such changes and modifications.

I claim:

A load release device for parachutes comprising an upper ring fitting, a sleeve member rigidly secured to said fitting, an upper clasp member longitudinally slidable within said sleeve member and having an upper and lower end, said upper clasp member being provided with a longitudinal bore therein closed at one end thereof, the other end of said bore being closed by an apertured member having a packing therein, a piston rod rigidly connected at one end thereof to said ring fitting and a piston rigidly connected at the other end thereof, said piston rod having a longitudinal passage at the end connected to said piston and communicating with a transverse passage therethrough, said piston being received in said bore for slidable movement therewith while said piston rod extends through the packing in said apertured member, said bore confining a fluid therein which can flow from one side of said piston to the other side thereof through the longitudinal and transverse passage in said piston rod, a lower clasp member having upper and lower ends connected at the upper end thereof to the lower end of said upper clasp member, said connected ends of the upper and lower clasp members being normally disposed within said sleeve, said lower clasp member having a lower ring fitting adjacent its lower end and extending below said sleeve member, said connected ends of the upper and lower clasp members being fully exposed without said sleeve in response to the forces exerted in opposite directions on the upper ring fitting and the lower ring fitting which moves said upper clasp member downwardly while fluid therein moves from the upper side of said piston through the transverse and longitudinal passages in said piston rod to the lower side of said piston.

References Cited in the file of this patent

UNITED STATES PATENTS

| Number | Name | Date |
|---|---|---|
| 2,386,932 | Cooper | Oct. 16, 1945 |
| 2,400,165 | Porter | May 14, 1946 |
| 2,424,215 | Anderson | July 22, 1947 |
| 2,483,044 | Gongwer | Sept. 27, 1949 |
| 2,517,361 | Statts | Aug. 1, 1950 |